(12) United States Patent
Park

(10) Patent No.: US 7,327,646 B2
(45) Date of Patent: *Feb. 5, 2008

(54) OPTICAL RECORDING MEDIUM AND METHOD FOR FORMATTING THE SAME WITH IMPROVED COMPATABILITY AND CONSISTENCY

(75) Inventor: Yong Cheol Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/774,437

(22) Filed: Feb. 10, 2004

(65) Prior Publication Data

US 2004/0156281 A1    Aug. 12, 2004

Related U.S. Application Data

(63) Continuation of application No. 09/480,107, filed on Jan. 10, 2000, now Pat. No. 6,963,523.

(30) Foreign Application Priority Data

Jan. 23, 1999    (KR) .................................. 1999-2127

(51) Int. Cl.
*G11B 7/24*    (2006.01)
(52) U.S. Cl. .................................. 369/47.22
(58) Field of Classification Search ............ 369/47.14, 369/53.17, 47.22; 714/54
See application file for complete search history.

(56) References Cited

U.S. PATENT DOCUMENTS

| | | | |
|---|---|---|---|
| 4,345,319 A | 8/1982 | Bernardini et al. | |
| 5,058,089 A | 10/1991 | Yoshimaru et al. | |
| 5,235,585 A | 8/1993 | Bish et al. | |
| 5,293,565 A * | 3/1994 | Jaquette et al. .......... | 369/275.3 |
| 5,303,219 A * | 4/1994 | Kulakowski et al. .... | 369/53.17 |
| 5,418,767 A * | 5/1995 | Gaudet et al. ........... | 369/53.16 |
| 5,648,954 A * | 7/1997 | Satoh ....................... | 369/53.17 |
| 5,715,221 A * | 2/1998 | Ito et al. .................. | 369/47.14 |
| 5,781,717 A | 7/1998 | Wu et al. | |
| 6,118,608 A * | 9/2000 | Kakihara et al. ............. | 360/53 |
| 6,288,989 B1 | 9/2001 | Ro et al. | |

FOREIGN PATENT DOCUMENTS

| | | |
|---|---|---|
| JP | 05-210845 | 8/1993 |
| JP | 05-298836 | 11/1993 |
| JP | 06-295538 | 10/1994 |

* cited by examiner

*Primary Examiner*—Gautam R. Patel
(74) *Attorney, Agent, or Firm*—Birch, Stewart, Kolasch & Birch, LLP

(57) ABSTRACT

An optical recording medium and method of formatting the optical recording medium is disclosed. In the present invention, the location information of the supplementary spare area, if assigned, is reset when the optical recording medium is formatted. The resetting of the location information results in consistency between a file system and a driver of the optical recording medium with respect to the supplementary spare area.

17 Claims, 7 Drawing Sheets

OPTICAL RECORDING MEDIUM AND METHOD FOR FORMATTING THE SAME WITH IMPROVED COMPATABILITY AND CONSISTENCY

CROSS-REFERENCE

The present application is a continuation of co-pending U.S. patent application Ser. No. 09/480,107 filed on Jan. 10, 2000 for which priority is claimed under 35 U.S.C. § 120; and the present application claims priority of patent application Ser. No. 2127/1999 filed in Republic of Korea on Jan. 23, 1999. The entire contents of each of these applications are herein fully incorporated by reference.

BACKGROUND OF THE INVENTION

1. Field of the Invention

The present invention relates to an optical recording medium and more particularly to a method of formatting a rewritable optical recording medium.

2. Discussion of Related Art

An optical storage medium is generally divided into a read only memory (ROM), a write once read many (WORM) memory into which data can be written one time, and rewritable memories into which data can be written several times. Rewritable optical storage mediums, i.e. optical discs, include rewritable compact discs (CD-R) and rewritable digital versatile discs (DVD–R, DVD-RAM, DVD+R).

The operations of writing and playing back data in a rewritable optical disc may be repeated. This repeated process alters the ratio of storage layers for recording data into the optical disc from the initial ratio. Thus, the optical discs lose their characteristics and generate an error during recording/playback. This degradation appears as a defective area at the time of formatting, recording on or playing back from an optical storage medium. Also, defective areas of a rewritable optical disc may be caused by a scratch on its surface, particles of dirt and dust, or errors during manufacture. Therefore, in order to prevent writing into or reading out of the defective area, management of such defective areas is necessary.

FIG. 1 shows a defect management area (DMA) in a lead-in area and a lead-out area of the optical disc to manage a defect area. Particularly, the data area is divided into a plurality of zones for the defect area management, where each zone is further divided into a user area and a spare area. The user area is where data is actually written and the spare area is used when a defect occurs in the user area.

There are four DMAs in one disc, e.g. DVD-RAM, two of which exist in the lead-in area and two exist in the lead-out area. Because managing defective areas is important, the same contents are repeatedly recorded in all four DMAs to protect the data. Each DMA comprises two blocks of 32 sectors, where one block comprises 16 sectors. The first block of the DMA, called a DDS/PDL block, includes a disc definition structure (DDS) and a primary defect list (PDL). The second block of the DMA, called an SDL block, includes a secondary defect list (SDL). The PDL corresponds to a primary defect data storage and the SDL corresponds to a secondary defect data storage.

The PDL generally stores entries of defective sectors caused during the manufacture of the disc or identified when formatting a disc, namely initializing and re-initializing a disc. Each entry is composed of an entry type and a sector number corresponding to a defective sector. The SDL lists defective areas in block units, thereby storing entries of defective blocks occurring after formatting or defective blocks which could not be stored in the PDL during the formatting. Each SDL entry has an area for storing a sector number of the first sector of a block having defective sectors, an area for storing a sector number of the first sector of a block replacing the defective block, and reserved areas. Accordingly, defective areas, i.e. defective sectors or defective blocks, within the data area are replaced with normal or non-defective sectors or blocks by a slipping replacement algorithm and a linear replacement algorithm.

The slipping replacement algorithm is utilized when a defective area is recorded in the PDL. As shown in FIG. 2A, if defective sectors m and n, corresponding to sectors in the user area, are recorded in the PDL, such defective sectors are skipped to the next available sector. By replacing the defective sectors by subsequent sectors, data is written to a normal sector. As a result, the user area into which data is written slips and occupies the spare area in the amount equivalent to the skipped defective sectors. For example, if two defect sectors are registered in the PDL, data would occupy two sectors of the spare area.

The linear replacement algorithm is utilized when a defective block is recorded in the SDL or when a defective block is found during playback. As shown in FIG. 2B, if defective blocks m and n, corresponding to blocks in either the user or spare area, are recorded on the SDL, such defective blocks are replaced by normal blocks in the spare area and the data to be recorded in the defective block are recorded in an assigned spare area.

As defective areas are compensated utilizing the spare area, methods of assigning the spare area plays an important role in the defective area management. Typically, the spare area may be allocated in each zone or group of the data area or may be allocated in a designated portion of the data area. One method is to allocate the spare area at the top of the data area, as shown in FIG. 3. In such case, the spare area is called a primary spare area (PSA). Namely, the data area excluding the primary spare area becomes the user area.

The primary spare area, assigned in an initial formatting process, is assigned when a manufacturer produces the optical disc or when a user initially formats an empty disc. Moreover, when defect sectors are registered in the PDL according to the initial formatting or reformatting of optical disc, data cannot be recorded in those defect sectors, reducing the recording capacity. Therefore, to maintain the initial data recording capacity, a portion of the primary spare area equivalent to the defective sectors registered on the PDL slips into or becomes a part of the user area during formatting. Accordingly, the PSN of the user area to which a value of LSN=0 is assigned varies depending upon the defective sectors registered on the PDL, where LSN represent a logical sector number.

If the primary spare area becomes full by slipping or linear replacement, as shown in FIG. 4A, a new spare area may be assigned, for example near the end of the user area. Such additional spare area is called a supplementary spare area (SA-sup). The location information of the supplementary spare area is stored in a specific area such as in a SDL block (apart from the SDL) of a DMA. Particularly, the location information includes the start address (the first sector number) and the end address (the last sector number) of the assigned supplementary spare area. Thus, the size as well as the location of the supplementary spare area can be ascertained from the information.

The assigned supplementary spare area may be enlarged when necessary as shown in FIG. 4B. Also, the location of the extended supplementary spare area is stored in the specific area of the DMA as in the initial assignment of the supplementary spare area. However, since a location information is already stored in the DMA, the start address of the supplementary spare area in the location information is modified. As a result, the location information of the supplementary spare area is modified each time the supplementary spare area is enlarged.

Moreover, even in optical recording mediums with assigned supplementary spare area as described above, defect sectors or blocks are registered in the PDL or SDL for defect area management. Accordingly, linear replacement and slipping replacement is utilized. However, for linear replacement, the optical pick-up must be transferred to and back from the spare area to the user area in order to record data for the defect blocks registered in the SDL within the assigned replacement blocks. Repetition of this may deteriorate the system performance. As a result, the optical medium is reformatted to move the defect sectors registered in the SDL to the PDL, thereby reducing the number of linear replacements and improving the system performance.

The reformatting method is classified into a full formatting through certification and a simple formatting by which the SDL is transferred to the $G_2$-list of the PDL without certification process in order to reduce the formatting time. The P-list (primary list of defects) remains unchanged after the completion of the formatting but defective blocks of the SDL are stored as defective sectors in the G2-list. Thus, the G2-list may include defective sectors as well as normal sectors. Nevertheless, the normal sectors are considered as defect sectors.

The full formatting, shown in FIG. 5A, reads the old DMA information and certifies all data area other than the defect sectors registered in the P-list of the old PDL. Rather, the P-list of the old PDL is converted to the P-list of the new PDL without any change. Furthermore, a full formatting disposes of the $G_1$-list and $G_2$-list of the old PDL as well as the old SDL and then registers defect sectors found during the certification in the $G_1$-list of the new PDL.

In contrast, the simple formatting, shown in FIG. 5B, converts the SDL to the $G_2$-list without certification. Namely, the old DMA information is read and sectors in the P-list, $G_1$-list and $G_2$-list of the old PDL are converted to the P-list, $G_1$-list and $G_2$-list of a new PDL. Also, after converting the old SDL entries to sixteen PDL entries, the old SDL entries are disposed and the new PDL entries converted from the old SDL entries, are registered in the $G_2$-list of the new PDL.

As such, upon execution of a reformatting, the supplementary spare area is considered to be non-existent by the file system because the defect information of the SDL has been moved to the PDL. However, since the location information of the supplementary spare area is stored in the SDL block of the optical disk apart from the disposed SDL, the location information of the supplemental spare area is maintained without change in the SDL block. Thus, an assignment of the supplementary spare area is still considered to be existent by the driver, namely the physical driver. Because the file system recognizes whether a formatting has been executed while the driver cannot, the file system and the driver have inconsistent information regarding the supplementary spare area. Accordingly, different judgments between the file system and driver regarding the supplementary spare area may cause problems in the system control.

Furthermore, a compatibility problem occurs when an optical recording medium as described above is transferred to other drivers. Specifically, when the optical recording medium is inserted into other driver, the driver first reads the DMA from the optical recording medium and informs the file system. Then, the file system constructs a new file system using the information delivered from the driver. At this time, since the location information of the supplementary spare area is still recorded in the SDL block of the DMA, the location information is also sent to the file system together with the information from the driver. Accordingly, the file system regards that the supplementary spare area has been assigned. As a result, the area registered in the SDL block is considered to be actual supplementary spare area and is excluded when assigning the supplementary spare area or when executing linear replacement, thereby producing problems in compatibility.

SUMMARY OF THE INVENTION

Accordingly, an object of the present invention is to solve at least the problems and disadvantages of the related art.

An object of the present invention is to provide an optical recording medium in which the location information of a supplementary spare area registered in the DMA is reset after a formatting the optical recording medium.

Another object of the present invention is to provide a method of formatting an optical recording medium, which resets the location information of a supplementary spare area registered in the DMA when the optical recording medium is formatted.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of formatting an optical recording medium includes resetting the location information of the supplementary spare area and converting the assigned supplementary spare area to a writable area. In the present invention, the location information of the supplementary spare area is stored in a specific area of the optical recording medium. In the preferred embodiment, the location information of the supplementary spare area is stored in the SDL of the DMA.

BRIEF DESCRIPTION OF THE ATTACHED DRAWINGS

The invention will be described in detail with reference to the following drawings in which like reference numerals refer to like elements wherein.

Figure 6:
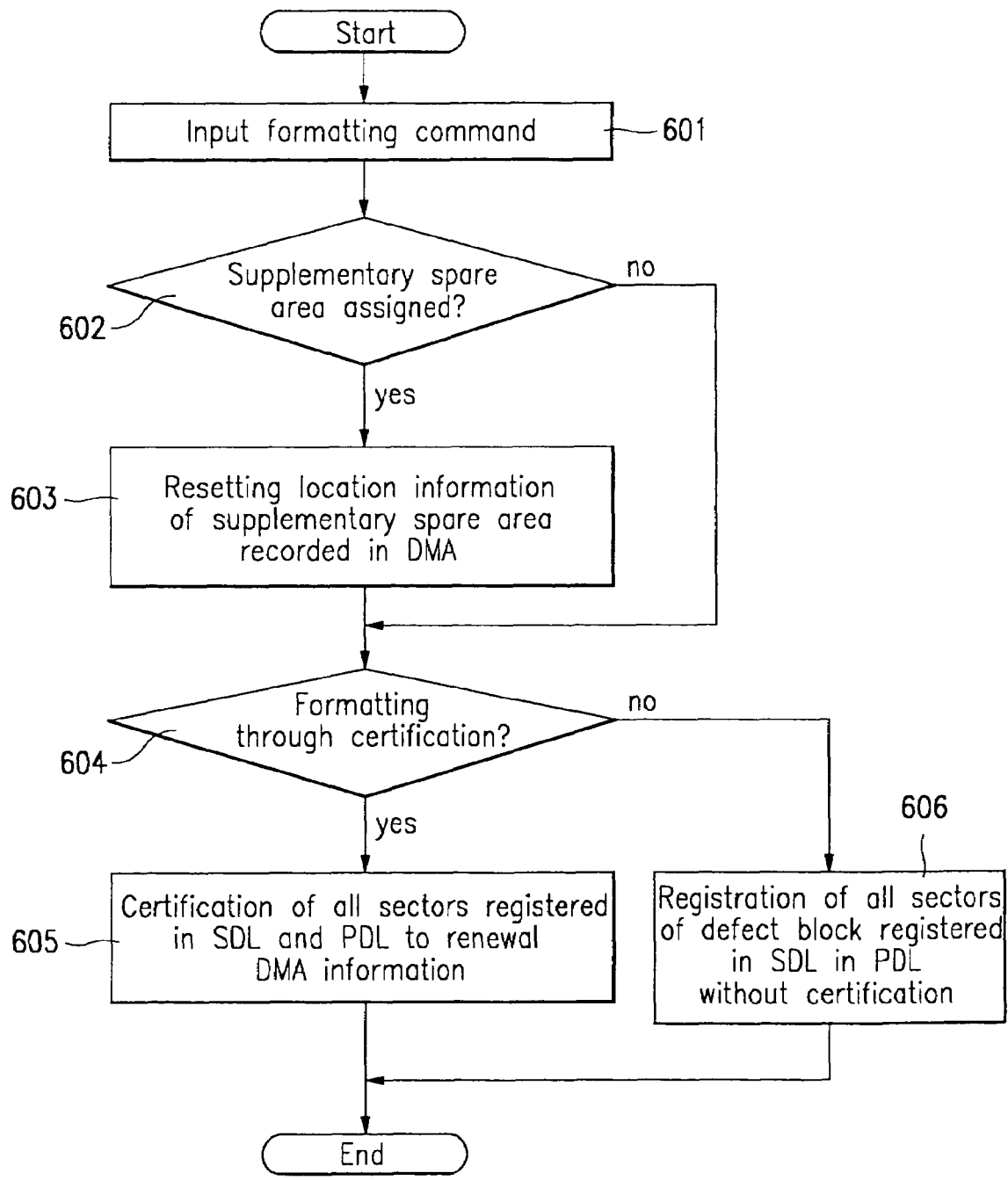

FIG. 6 a flow diagram showing a method of formatting the optical recording medium according to the present invention.

DETAILED DESCRIPTION OF PREFERRED EMBODIMENT

Reference will now be made in detail to the preferred embodiments of the present invention, examples of which are illustrated in the accompanying drawings.

Generally, the present invention resets the location information of the supplementary spare area registered in the SDL block when an optical recording medium is formatted. Thus, the judgments of the file system and the driver would match each other with respect to the supplementary spare area. FIG. 6 is a flow diagram showing the operation of a driver when formatting the optical recording medium according to an embodiment of the present invention.

Referring to FIG. 6, upon receiving a formatting command (step 601), a judgment is made if a supplementary spare area has been assigned (step 602). If the supplementary spare area assignment exists, the location information of the supplementary spare area recorded in the DMA is reset (step 603) to an initial or nullified state. To reset the location information of the supplementary spare area, any one of a variety of methods may be utilized. In one example, all the location information values of the supplementary spare area may be converted to the lowest value (for example, 00 h) or the highest value (for example, FFh), nullifying any previously stored address information. In another example, the location information may be converted into a specific code value according to a predetermined agreement. That is, the location information value may be converted to a value which would allow the file system to recognize that location information of the supplementary spare area has been reset when the file system receives the DMA information from the driver.

Figure 1:
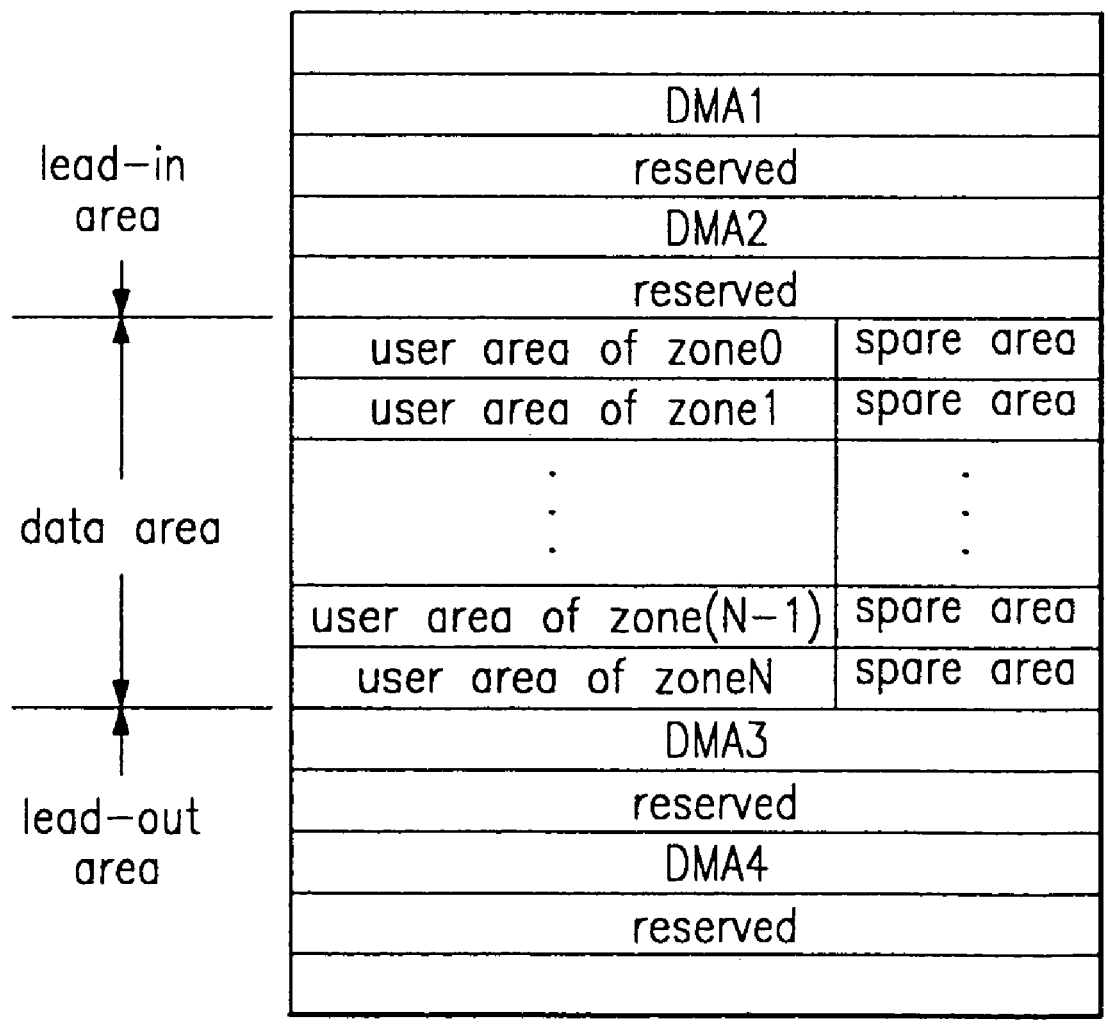
FIG. 1 shows a structure of a general optical recording medium in the related art.
Figure 2A:
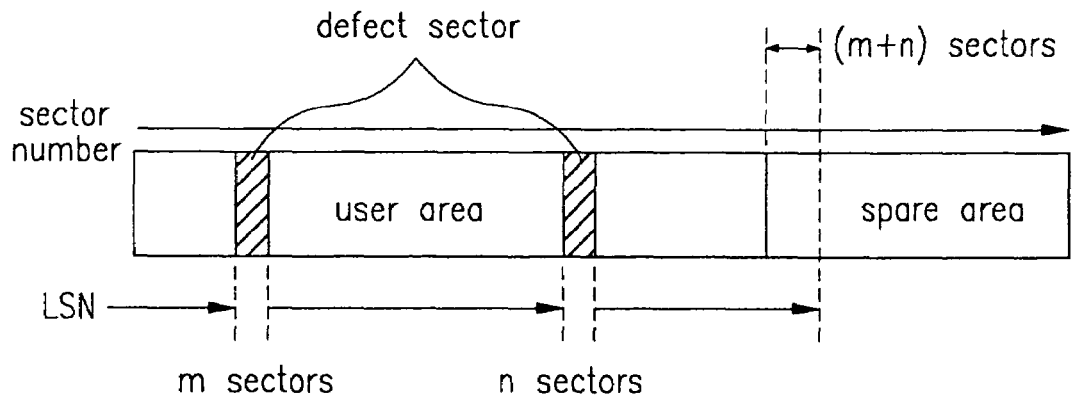
FIG. 2A shows a slipping replacement algorithm in the related art.
Figure 2B:
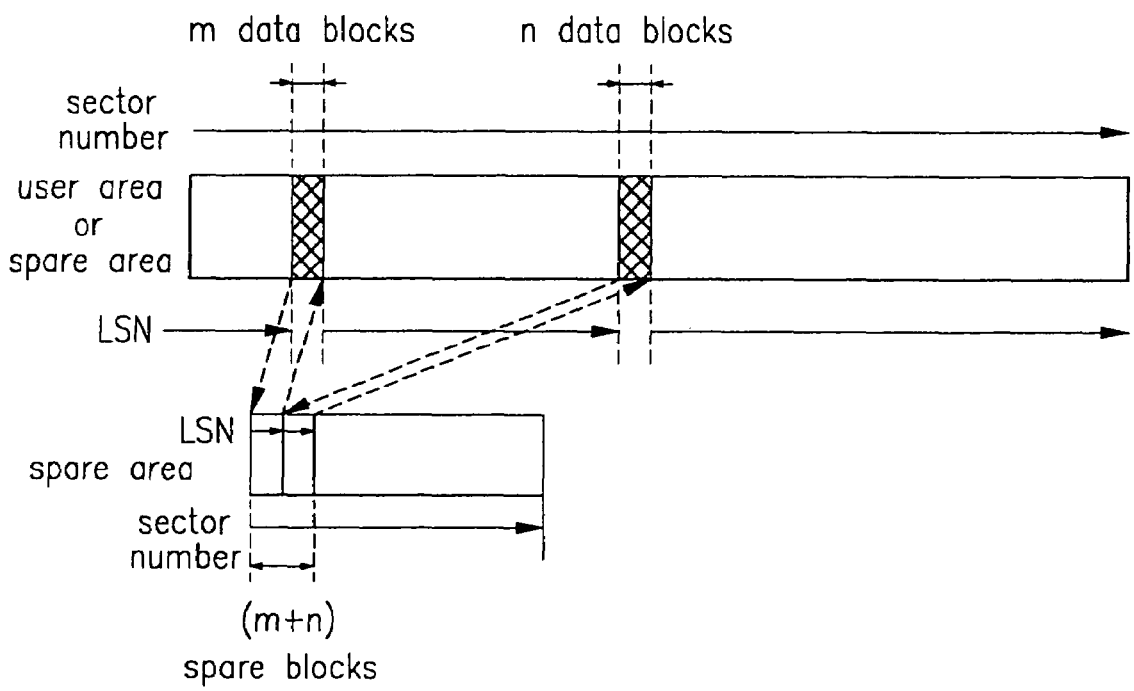
FIG. 2B shows a linear replacement algorithm in the related art.
Figure 3:
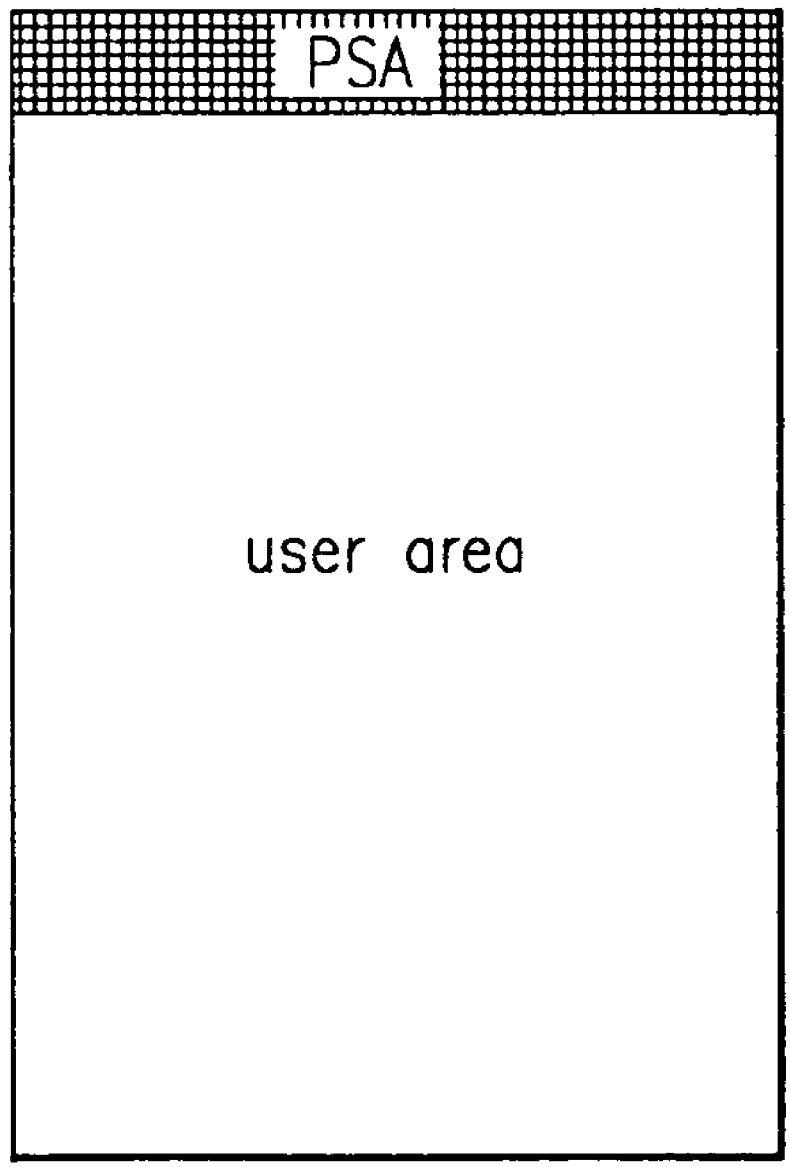
FIG. 3 shows when a spare area is assigned at the top of the data area.
Figure 4:
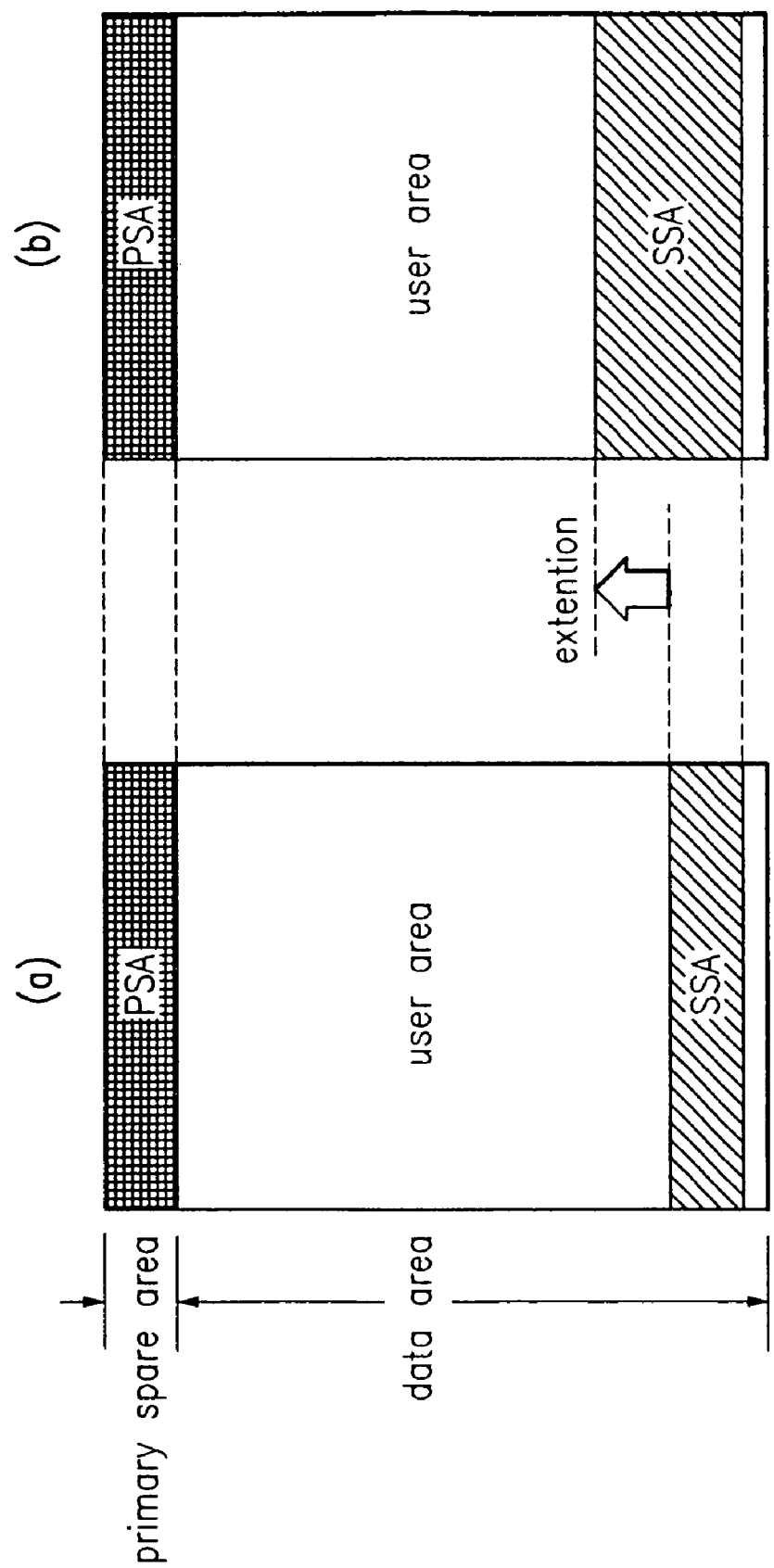
FIGS. 4A and 4B show assigning and expanding a supplementary spare area in a disc with a primary spare area as shown in FIG. 3.
Figure 5A:
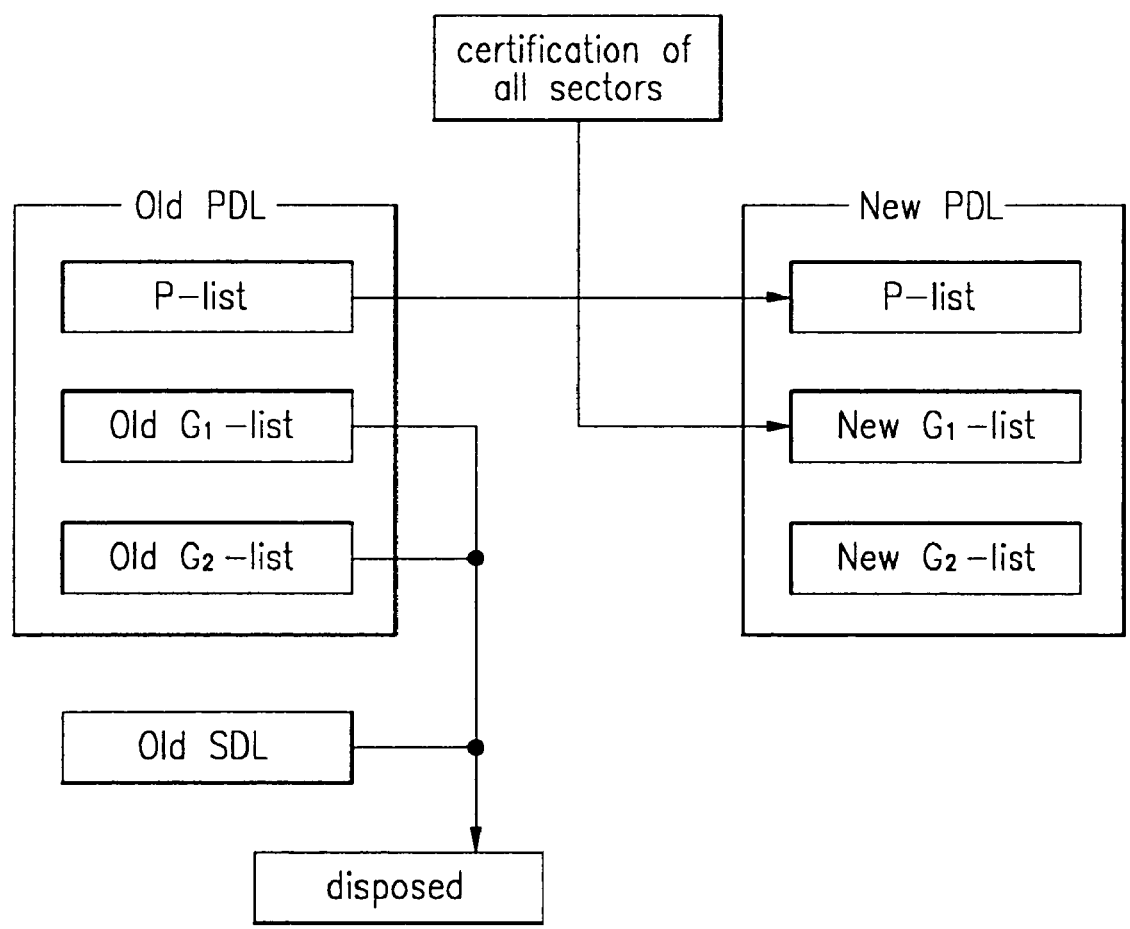
FIG. 5A shows an example of a full formatting with certification.
Figure 5B:
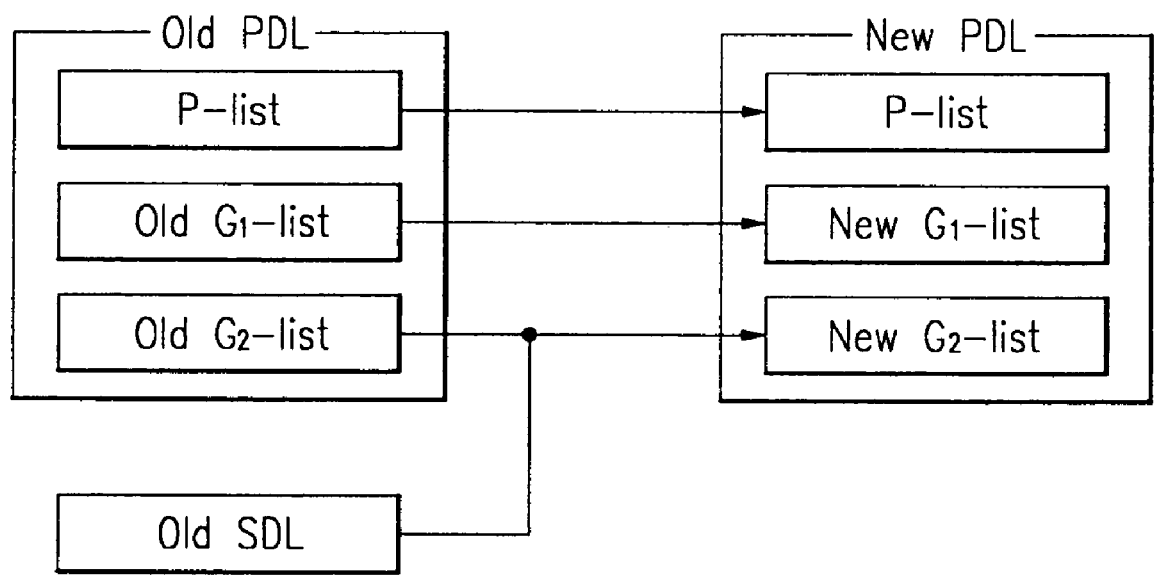
FIG. 5B shows an example of a simple formatting without certification.

After resetting the location information of the supplementary spare area in step 603 or if a supplementary spare area has not been assigned as determined in step 602, a judgment is made whether the formatting is with certification (step 604). If the formatting is with certification, all sectors, including the sectors registered in the PDL and the SDL, are certified as shown in FIG. 5A (step 605). Thus, sectors judged to have defects are registered in the new PDL and the old SDL and $G_1$ and $G_2$ list are disposed. On the other hand, if the formatting is judged to be without certification, all sectors registered in the SDL are registered in the new PDL without change as shown in FIG. 5B (step 606). In both cases of formatting (with or without certification), the effect is registering defective sectors previously registered in the old SDL to the new PDL by the formatting process.

Upon completion of formatting as described above, the sectors of the supplementary spare area corresponding to the defective sectors registered on the new PDL slip into and become a part of the user area to maintain the initial data recording capacity. At this time, recognizing that a formatting has been performed, the file system disposes of the information of the supplementary spare area. Accordingly, the information of the supplementary spare area is disposed of by both the driver and the file system after the formatting.

In the above embodiment, the location information of the supplementary spare area is reset prior to the formatting when a formatting command is input. However, the location information of the supplementary spare area may be reset after the formatting. In such case, steps 604~606 would proceed prior to steps 602~603 when a formatting command is received in step 601.

Thus, according to the optical recording medium and method of formatting the optical recording medium in the present invention, the location information of the supplementary spare area registered in the DMA is reset when the optical recording medium is formatted. This allows the judgments of the file system and the driver regarding the supplementary spare area to match each other, thereby leading to a consistent system control and maintenance of compatibility when the optical recording medium is transferred to different drivers.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of formatting an optical recording medium, said optical recording medium including a first spare area, a second spare area for replacing a defective unit with available replacement unit, and a defect management area including a defect management information for managing a defective area, the method comprising:
   (a) formatting the optical recording medium in response to the formatting request at least to use the second spare area as a continuous portion of a user data area after formatting, wherein the second spare area is changed into the continuous portion of the user data area by formatting so that a size of the user data area is increased; and,
   (b) resetting a location information of the second spare area to indicate a changed size of the second spare area after formatting,
   wherein the step (a) of formatting the optical recording medium includes creating a new defect list of the defect management area to replace an old defect list in response to changing of the second spare area, and
   wherein the second spare area has a variable size and a start position of the second spare area is varied, depending upon the variance of the size of the second spare area, while an end position of the second spare area is fixed and is located close to a lead-out area of the recording medium.

2. The method of claim 1, further comprising:
   (c) determining if the second spare area has been assigned prior to said formatting step (a) and said resetting step (b),
   wherein said steps (a) and (b) are performed if the second spare area has been assigned.

3. The method of claim 1, wherein said formatting step (a) comprises:
   (a1) registering sectors judged to have defects into the new defect list, if the optical recording medium is to be formatted with certification.

4. The method of claim 3, wherein said formatting step (a) further comprises:
   (a2) disposing an old defect list that existed prior to said formatting step (a), if the optical recording medium is to be formatted with certification.

5. The method of claim 1, wherein said formatting step (a) comprises:

(a1) registering all sectors previously judged in an old defect list into the new defect list if the optical recording medium is to be formatted without certification.

6. The method of claim 1, further comprising:
(c) storing the location information of the second spare area in the defect management area of the optical recording medium.

7. The method of claim 6, wherein the location information of the second spare area includes the start position of the second spare area on the optical recording medium.

8. The method of claim 7, wherein said resetting step (b) comprises:
(b1) resetting the start position of the location information.

9. A method of formatting an optical recording medium, said recording medium including a first spare area, a second spare area for replacing a defective area with available replacement area which has a variable size, and a defect management area including a defect management information for managing the defective area, the defect management information including a first information to indicate a defective unit found at least after formatting, the first information further including a second information to indicate a location of the second spare area, the method comprising:
(a) checking if a command for formatting of the optical recording medium is received;
(b) changing the second spare area to a continuous portion of a user data area in order to increase a size of the user data area, if the command is received, while resetting the second information to indicate a changed size of the second spare area after formatting; and
(c) creating a new defect list of the defect management area to replace an old defect list in response to changing of the second spare area,
wherein the second information includes start and end addresses of the second spare area, and the end address is fixed and is located close to a lead-out area of the recording medium, while the start address is varied, upon the variance of the size of the second spare area.

10. A recording medium, comprising:
a first spare area and a second spare area for replacing a defective area with an available replacement area; and
a defect management area including a defect management information for managing a defective area, the defect management information including a first information to indicate the defective area found at least after formatting, the first information further including a second information to indicate a location of the second spare area,
wherein the second spare area is changed to a continuous portion of a usable user data area in order to increase a size of the usable user data area when formatting, while the second information is reset to indicate a changed size of the second spare area after formatting, and
wherein the second spare area has a variable size and a start position of the second spare area is varied, depending upon the variance of the size of the second spare area, while an end position of the second spare area is fixed and is located close to a lead-out area of the recording medium, and
wherein a new defect list of the defect management area is created to replace an old defect list in response to changing of the second spare area when formatting.

11. A method of formatting an optical recording medium, said optical recording medium including a spare area for replacing a defective unit with an available replacement unit, and a defect management area including a defect management information for managing a defective area, the method comprising:
formatting the optical recording medium in response to a formatting request at least to use a portion of the spare area as a continuous portion of a user data area after formatting, thereby increasing a size of the user data area in a continuous manner; and
changing a location information of the spare area to reflect the changed size of the spare area after formatting,
wherein the formatting the optical recording medium includes creating a new defect list of the defect management area to replace an old defect list in response to changing of the spare area.

12. The method of claim 11, further comprising:
determining if the spare area has been assigned prior to the formatting of the optical recording medium; and
performing the formatting of the optical recording medium based on the determining result.

13. The method of claim 11, wherein the formatting of the optical recording medium comprises:
registering defective sectors in the user data area at a new primary defect list if the optical recording medium is formatted with certification.

14. The method of claim 13, wherein the formatting of the optical recording medium further comprises:
disposing an old secondary defect list prior to the formatting if the optical recording medium is formatted with the certification.

15. The method of claim 11, wherein the formatting of the optical recording medium comprises:
registering all sectors which have previously been registered at an old secondary defect list, at a new primary defect list, if the optical recording medium is formatted without certification.

16. The method of claim 11, further comprising:
storing location information of the spare area in the defect management area.

17. The method of claim 16, wherein the location information of the spare area includes a start position of the spare area.

* * * * *